United States Patent [19]
Stockley

[11] Patent Number: 6,114,663
[45] Date of Patent: Sep. 5, 2000

[54] PROGRAMMABLE CONVECTION OVEN

[76] Inventor: Edward E. Stockley, 8609 Lancome Dr., Plano, Tex. 75025

[21] Appl. No.: 09/281,041

[22] Filed: Mar. 30, 1999

[51] Int. Cl.$^7$ .............................. A21B 1/14; A21B 1/22; F24C 7/06

[52] U.S. Cl. ............................................ 219/398; 219/411

[58] Field of Search .................................. 219/411, 412, 219/413, 398, 392

[56] References Cited

U.S. PATENT DOCUMENTS

| | | | |
|---|---|---|---|
| 3,828,163 | 8/1974 | Amagami et al. | 29/413 |
| 4,164,643 | 8/1979 | Peart et al. | 219/411 |
| 4,238,669 | 12/1980 | Huntley | 219/398 |
| 4,506,652 | 3/1985 | Baker et al. | 126/21 A |
| 4,575,616 | 3/1986 | Bergendal | 219/411 |
| 4,761,529 | 8/1988 | Tsisios | 219/400 |
| 4,960,977 | 10/1990 | Alden | 219/411 |
| 5,157,239 | 10/1992 | Kanaya et al. | 219/411 |
| 5,378,872 | 1/1995 | Jovanovic | 219/411 |
| 5,382,441 | 1/1995 | Lentz et al. | 426/241 |
| 5,665,259 | 9/1997 | Westerberg | 219/411 |
| 5,695,668 | 12/1997 | Boddy . | |
| 5,712,464 | 1/1998 | Westerberg | 219/411 |
| 5,883,362 | 3/1999 | Pettibone et al. | 219/411 |
| 5,958,271 | 9/1999 | Westerberg et al. | 219/413 |

*Primary Examiner*—Joseph Pelham
*Attorney, Agent, or Firm*—Arthur F Zobal

[57] ABSTRACT

The oven comprises a housing and a ceramic support member located in the housing for supporting food to be cooked. A lower electrical heating element is located below the support member. Two laterally spaced apart upper electrical heating elements are supported above the support member and the food to be cooked. An electrical system is provided for supplying electrical power to the lower electrical heating element and to the two upper electrical heating elements. A control unit is provided for controlling electrical power applied to the lower heating element and to the two upper electrical heating elements to allow electrical power to be applied to each of the two upper electrical heating elements simultaneous or separately. The control unit may be adjusted to vary the cooking time period that electrical power is applied to each of the upper electrical heating elements and for controlling the amount or percentage of electrical power applied to each of the upper electrical cooking elements during its cooking time period.

18 Claims, 6 Drawing Sheets

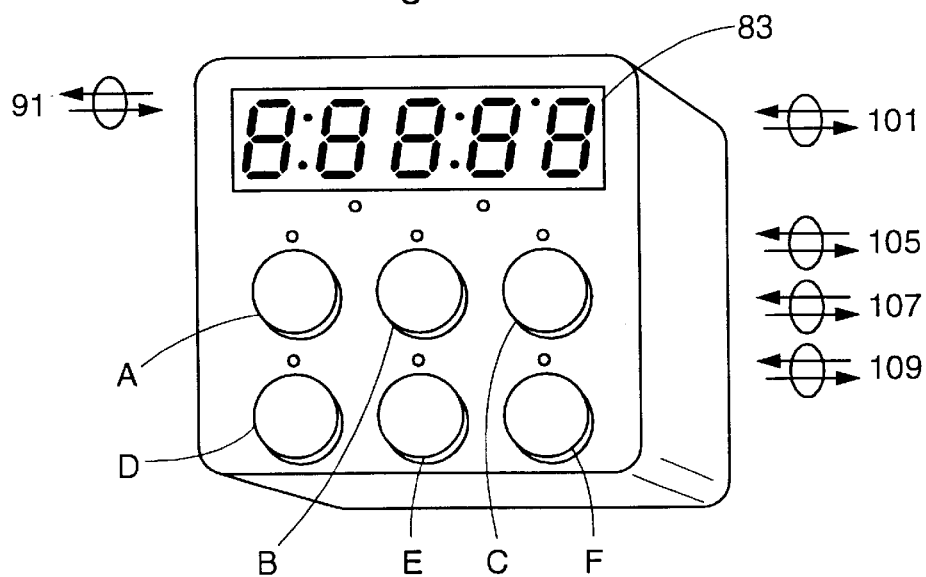
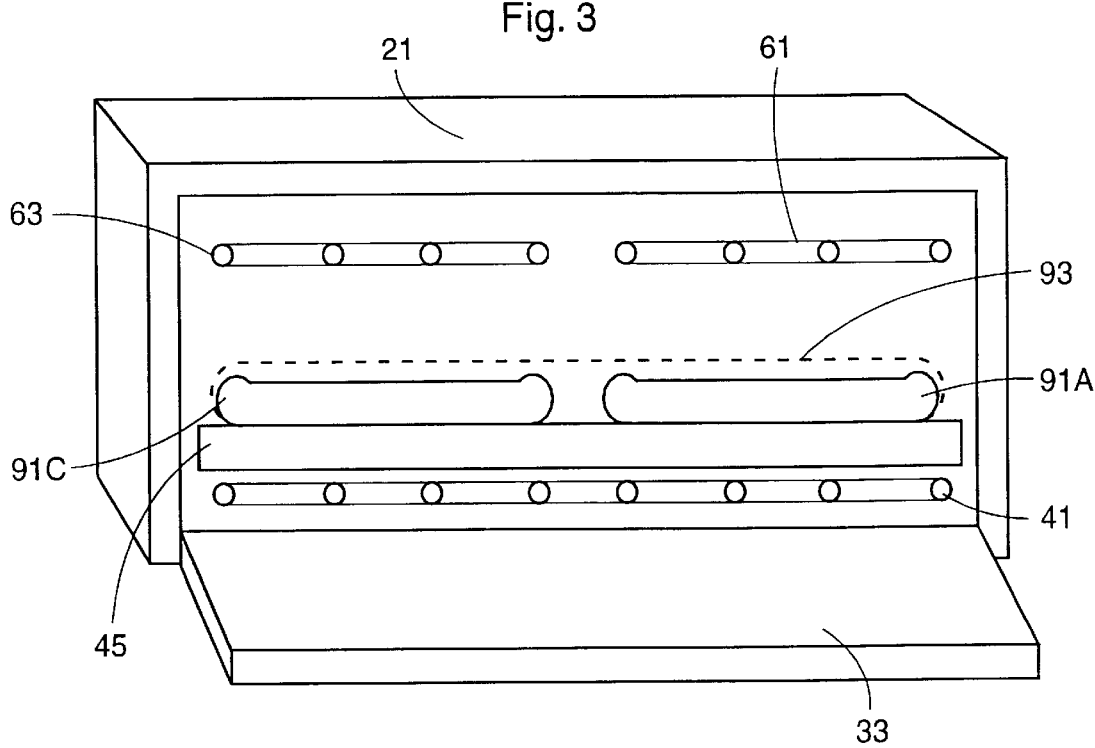

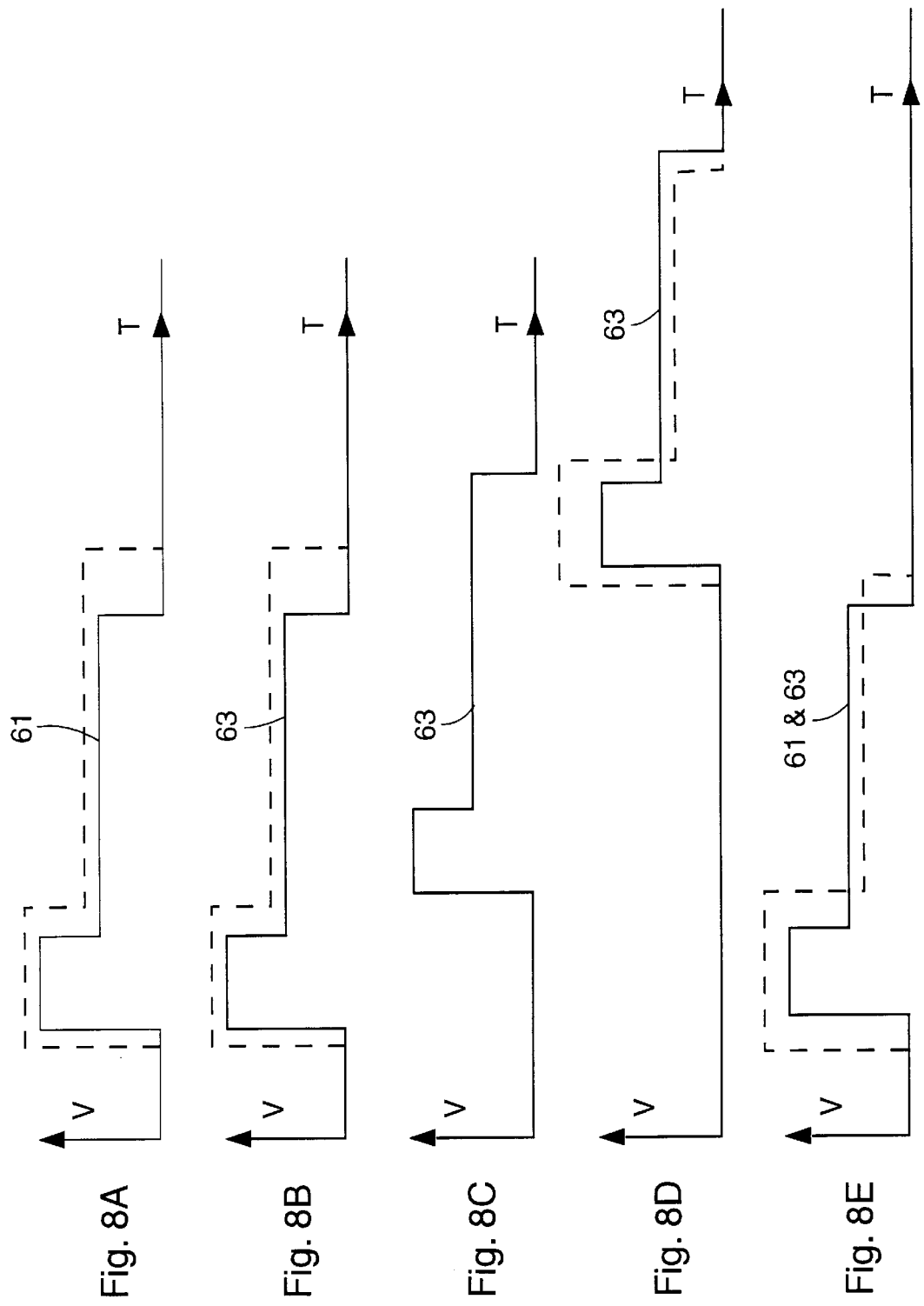

PROGRAMMABLE CONVECTION OVEN

BACKGROUND OF THE INVENTION

1. Field of the Invention

The invention relates to a programmable electrical convection oven for cooking food such as pizza.

2. Description of the Prior Art

Conventional electric ovens usually are designed to cook food by heating the oven to a set temperature and using a timer to notify the operator when the time is completed. The temperature and cooking time have to be set each time a food product is to be cooked. Ovens of this type are slow and use a lot of energy and are inefficient particularly if a small food product is to be cooked. One type of electrical oven for cooking pizza is disclosed in U.S. Pat. No. 5,695,668.

SUMMARY OF THE INVENTION

It is an object of the invention to provide a new and useful electrically operated oven for cooking food such as pizza which can cook the food quickly and economically and which can be programmed to cook different types of food at different times and temperatures.

The oven comprises a housing and support means located in the housing for supporting food to be cooked. A lower electrical heating element is located below the support means. Two laterally spaced apart upper electrical heating elements are supported above the support means and the food to be cooked. Means is provided for supplying electrical power to the lower electrical heating element and to the two upper electrical heating elements. Control means is provided for controlling electrical power applied to the lower heating element and to the two upper electrical heating elements to allow electrical power to be applied to each of the two upper electrical heating elements simultaneous or separately.

In another aspect, the control means comprises means for setting the cooking time period that electrical power is applied to each of the upper electrical heating elements and for controlling the amount of electrical power applied to each of the upper electrical cooking elements during its heating time period.

The control means also may be used for ovens that employ a single upper heating element or more than two upper heating elements for controlling the cooking time period and amount of power applied to the heating elements during the cooking time period.

BRIEF DESCRIPTION OF THE DRAWINGS

FIG. 3 is a front view of the oven of FIG. 1 with its door in an open position.

FIG. 4 is a block diagram of the controller used in conjunction with the oven of FIGS. 1–3.

FIG. 8 are timing diagrams of the voltages applied to the two upper cooking elements of the oven of the invention.

DESCRIPTION OF THE PREFERRED EMBODIMENTS

Figure 1:
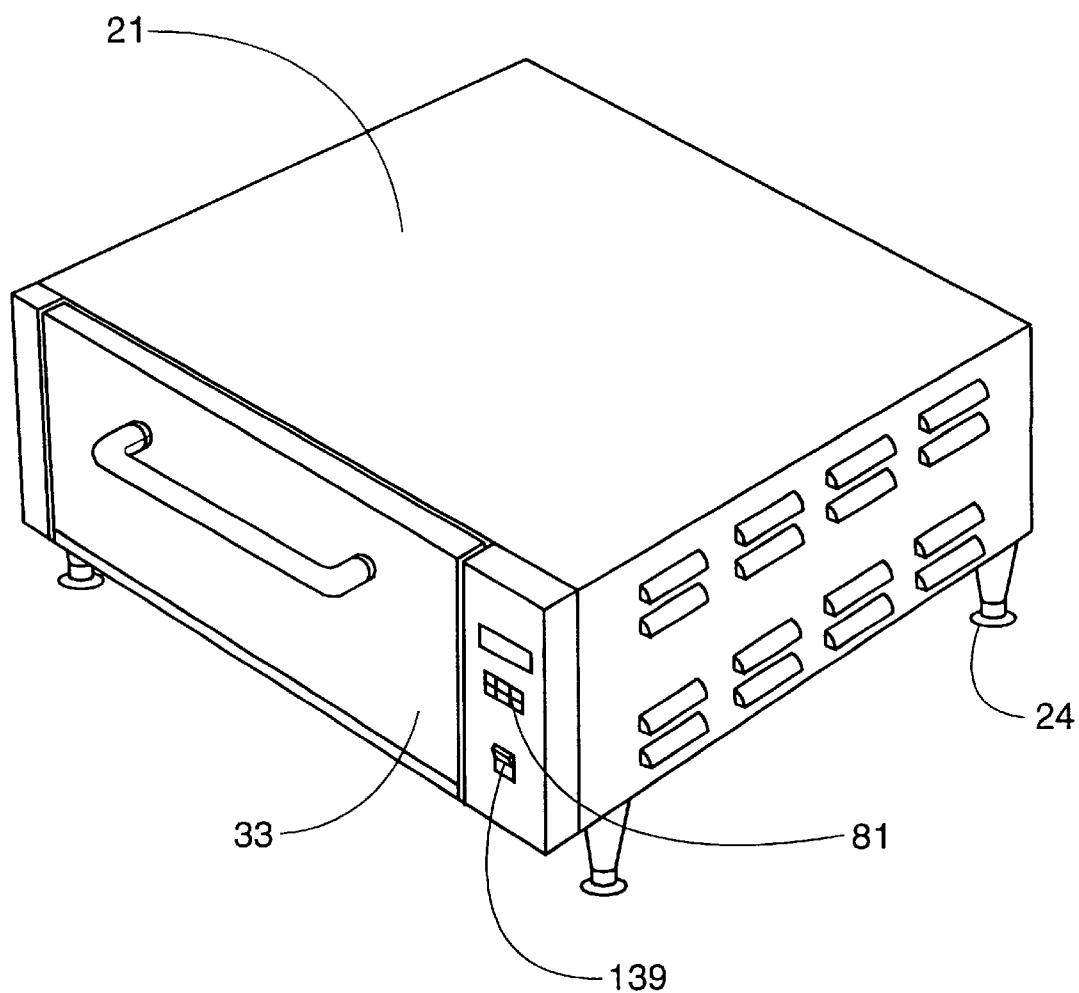
FIG. 1 is an isometric view of the oven of the invention.

Referring now to the drawings, the oven of the invention is identified at 21. It comprises a housing or cabinet formed by a bottom wall 23, supported by legs 24, two side walls 25 and 27 connected to a top wall 29, a rear wall 31 and a front door 33 which has its lower end pivotally coupled to the front edge of the bottom wall 23 such that the door 33 can move between a closed position as shown in FIG. 1 to an open position as shown in FIG. 3. The walls 25, 27, and 31, have vent apertures 25A, 27A and 31A respectively. A rectangular frame member 35 having inner liner walls 35A, 35B, and 35C is coupled to and supported by the bottom wall 23. An electrical coil or heating element 41 is supported by the bottom wall 23. Walls 35A and 35B have dimple spacers 43 for supporting a ceramic or brick food supporting member 45 above the heating element 41. A rectangular metal frame 51 having a central opening is provided for supporting two metal electrical coils or heating elements 61 and 63 above the food supported by the member 45. The frame 51 has inner side wall liners 51A, 51B, and 51C which engage and are supported by liners 35A, 35B, and 35C, respectively to support the frame at the desired height above the support member 45.

A baffle 71 having an opening 73 is supported behind the brick 45 and spaced from the rear wall 31. Supported in the space between the baffle 71 and the rear wall 31 is an electric motor 75 for operating a fan 77.

Figure 2:
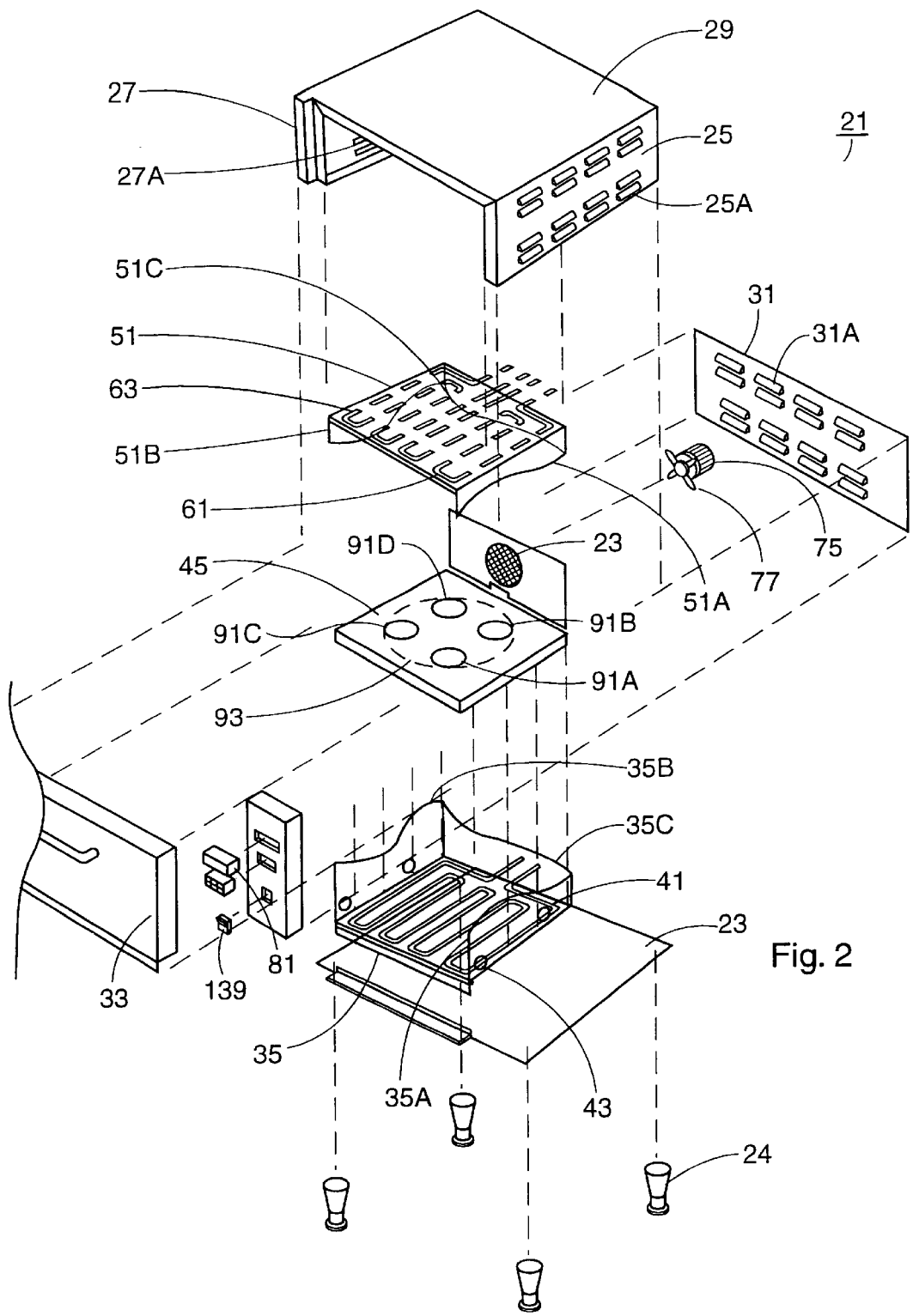
FIG. 2 is an exploded view of the oven of FIG. 1.

A controller 81 in an electrical system as shown in FIGS. 4–8 is provided for operating the three electrical heating elements 41, 61, and 63 for cooking the food supported by the brick member 45. The brick member 45 may support two small pizzas 91A and 91B under the heating element 61 and two small pizzas 91C and 91D under the heating element 63 or one large pizza 93 under both heating elements 61 and 63 as shown in FIGS. 2 and 3. The controller 81 and a thermocouple 183 are employed to apply electrical power to the lower heating element 41 to heat the brick 45 and hence interior of the oven to the desired temperature and to maintain the desired temperature in the oven. The fan 77 aids in the heating procedure in that it draws hot air over the food being cooked. The controller 81 is programmed in that it may operate the upper heating elements 61 and 63 either separately or simultaneously each for a given time period to provide two separate upper heating or cooking zones or single upper heating or cooking zone. In this respect the controller 81 may operate to energize only the right upper heating element 61 for a given time period to cook one or two small pizzas P1 and P2 under the element 61 or it may operate to energize only the left upper heating element 63 for a given time period to cook one or two small pizzas P3 and P4 under the element 63, as shown in FIGS. 8A and 8B. It can energize element 61 starting at a given time and then energize element 63 starting at a different time to start the cooking period for a small pizza under element 61 and then at a delayed time to start the cooking period for a small pizza under element 63, as shown in FIGS. 8A, 8C, and 8D. The controller 81 also can energize both elements 61 and 63 beginning at the same starting time for given cooking period to cook a large pizza under both of the heating elements 61 and 63, as shown in FIG. 8E. During each cooking time period that elements 61 and/or 63 are energized the electrical power applied to each element preferably will be at a high level for a short initial period and then drop to a lower level for the remainder of the time period. The controller 81 is of the type manufactured by Watlow Controls of Mimona, Minn. and is identified as the Mini Chef 2000. It has six buttons A, B, C, D, E, and F and a five-digit seven segment numeric LED display 83. It also has one LED indicator light LA, LB, LC, LD, LE, LF for each key or button and a LED indicator lights LG and LH for indicating the on/off state of the heating elements 63 and 61 respectively. The controller 81 also has a sensor input 91 and three switched D.C. signal outputs 101, 103, and 105 and an output 109 (audible alarm output). The controller also has a microchip EPROM (electrically programmable read only member).

For purposes of the present invention, software has been programmed into the EPROM of controller 81 to allow each cooking time of the elements 61 and/or 63 to be of a given duration and the percentage of power applied to the elements 61 and 63 to be 100% initially and at a lower percentage i.e. 50% power the remainder of the cooking time of elements 61 and 63. The total cooking time of each of the elements 61 and/or 63 may be 2½ minutes. The cooking times and electrical power applied to the two elements 61 and 63 may be programmed to different values, as shown by the dotted lines in FIGS. 8A–8E.

For purposes of this invention, the inputs and outputs of the controller 81 are used as follows. Sensor input 91 is used to sense the temperature of the brick heater 45. Power input 95 is used to apply power to the controller 81. Event input 97 is not used. Output 101 is used to control the bottom element 41. Output 105 is used to control the upper left element 63. Output 107 is used to control the upper right element 61. Output 109 is used to control a remote buzzer. Outputs 101, 105 and 107 are voltages having values of 3–32 volts D.C. The output 109 is equal to about 5 volts D.C.

The controller 81 can be operated in an operations mode and in a configuration or edit mode. In the operations mode, the buttons of the controller will operate as shown in conjunction with FIG. 6. In the edit mode, the buttons will operate as shown in conjunction with FIG. 7.

In the operations mode the controller 81 operates in a preset or pre-programmed manner as follows. During normal operations, a press of key A will initiate cooking in the left side of the oven. A second press of this key will pause the cooking time for the left side. During cooking operations, by pressing and holding, this key will reset the cooking cycle for the left side. During normal operations, a press of key B will initiate cooking in the entire oven. A second press of this key will pause the cooking time for the entire oven. During cooking operations, by pressing and holding this key will reset the cooking cycle for the entire oven. During normal operations, a press of key C will initiate cooking in the right side of the oven. A second press of this key will pause the cooking time for the right side. During cooking operations, by pressing and holding this key will reset the cooking cycle for the right side.

A press of button D will add 10 seconds to the cooking time of element 63, after the original cooking time of element 63 is complete. A press of button F will add 10 seconds to the cooking time of element 61 after the original cooking time of element 61 is complete. A press of button E will display the temperature in the oven. If a large profile is being cooked, a press of either "D" or "F" buttons will add 10 second of cooking time of elements 61 and 63 after the original cooking time of elements 61 and 63 is complete.

A single press of button E will display the oven temperature for 3 seconds. If the key is pressed a second time prior to the end of the 3 seconds, the temperature will remain displayed indefinitely. When the temperature display is held to the display, a single press of the Temperature key will return to normal timing displays.

In one embodiment, the cooking time for elements 61 and/or 63 may be 2.5 minutes. As mentioned previously, the EPROM or microchip of the controller 81 has been programmed in accordance with the present invention such that for the preset cooking time of elements 61 and/or 63, the controller 81 controls the relays 151 and 171 to allow 100% electrical power to be applied to the heating elements 63 and 61 initially from the 220 volt leads 121, 123 for example for about 30 seconds and then for the remaining 2 minutes, less than 100% (i.e. 50%) electrical power to be applied thereto.

Figure 5:
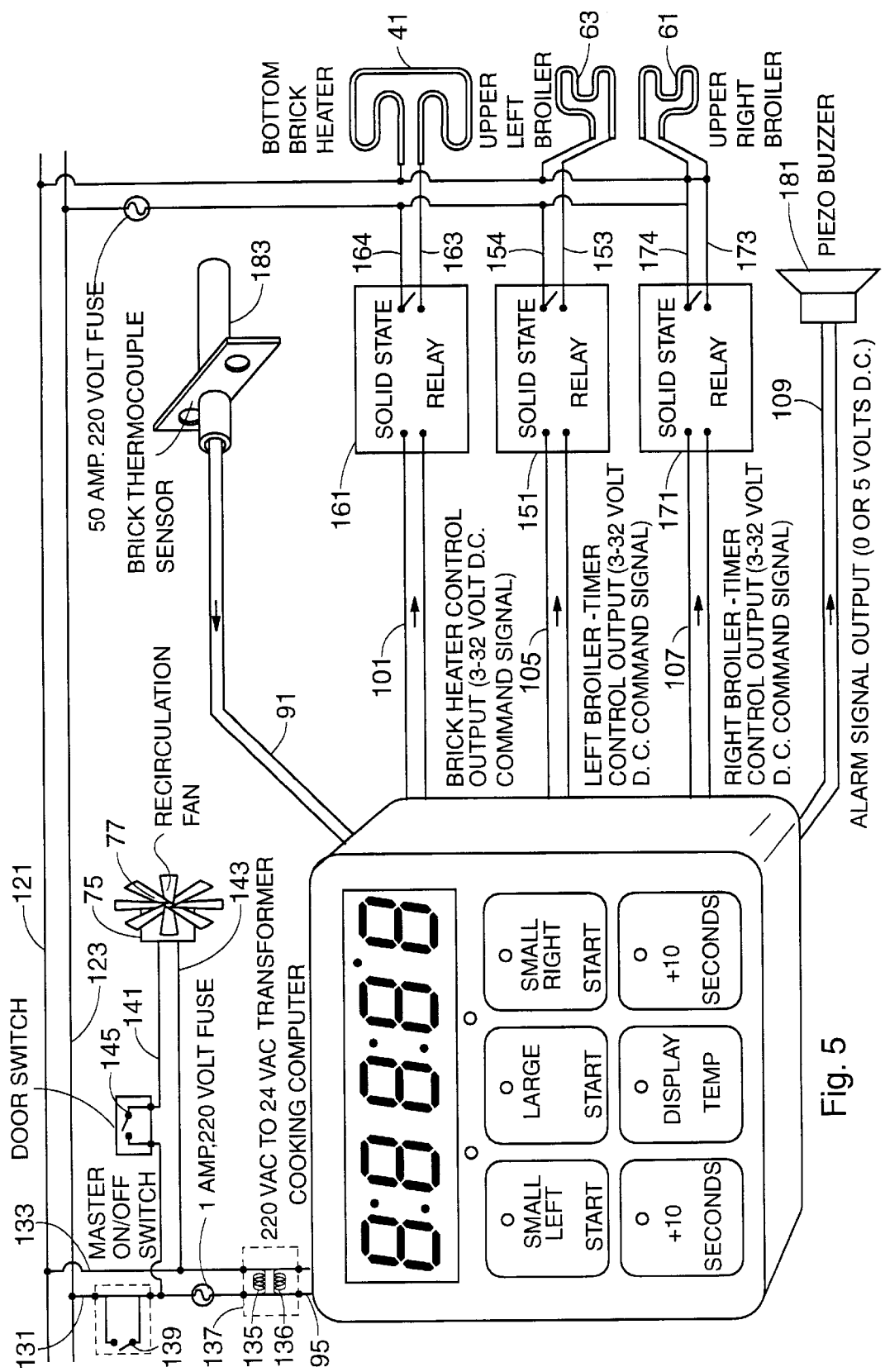
FIG. 5 is a schematic of the system used in conjunction with the oven and controller of FIGS. 1–4.
Figure 6:
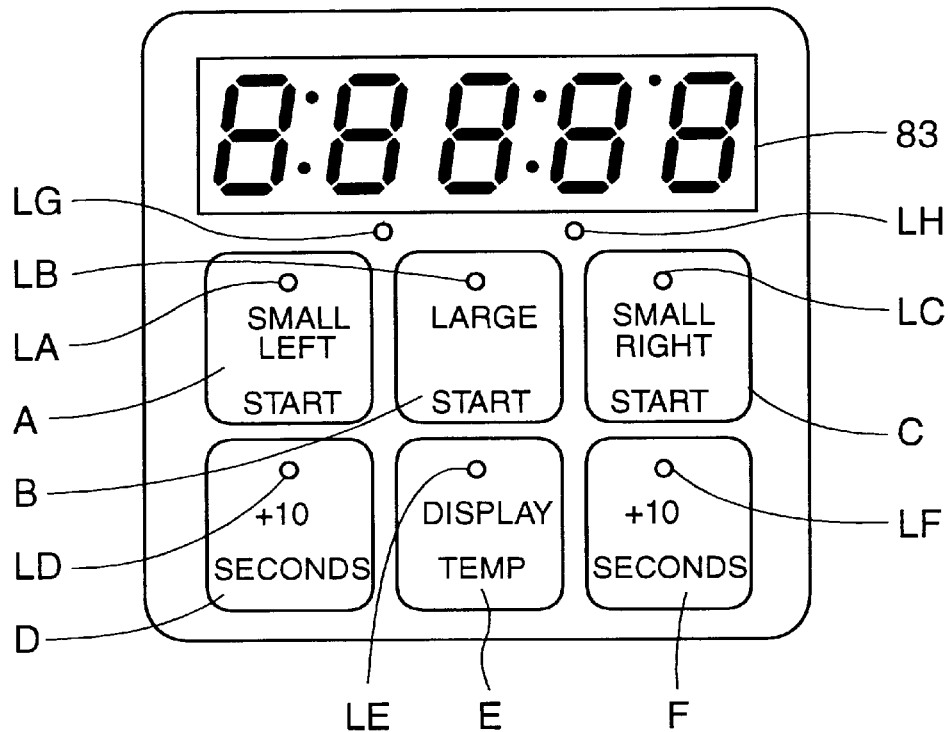
FIG. 6 is a front view of the controller in its operational mode.
Figure 7:
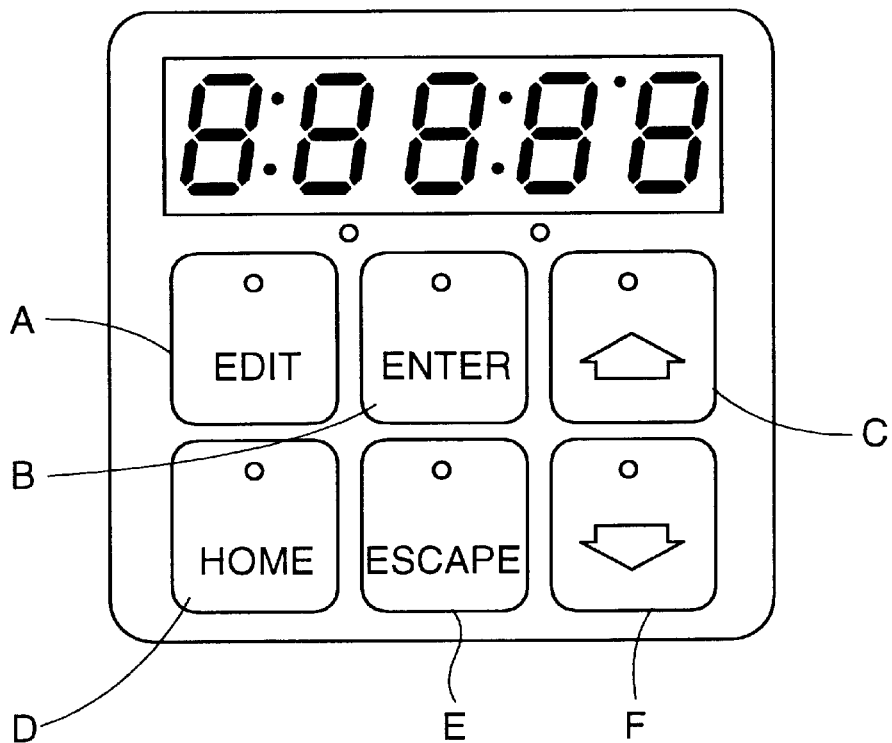
FIG. 7 is a front view of the controller in its set up mode.
Figure 5:
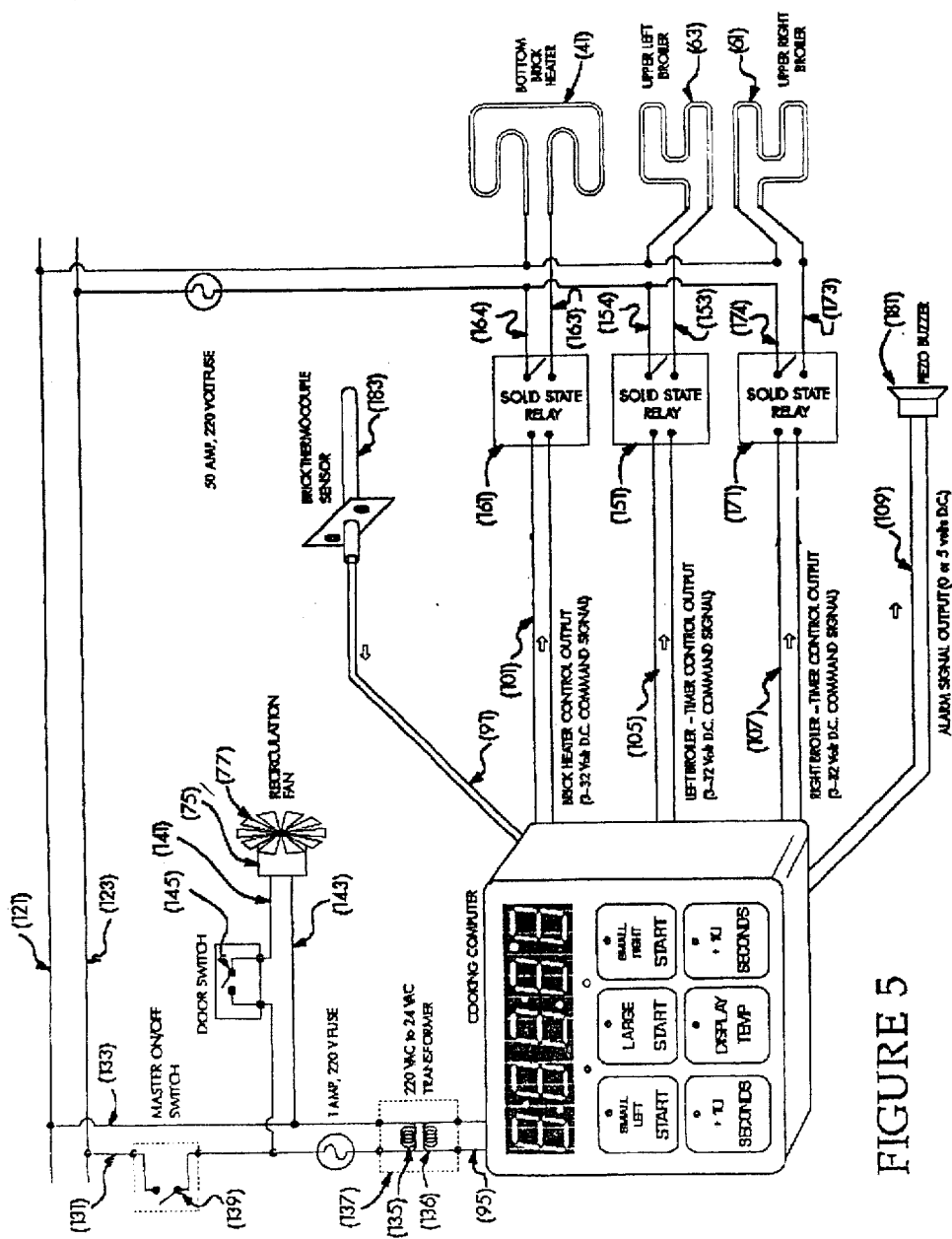

Referring now to FIGS. 4 and 5 there will be described the electrical system for operating the oven of the invention.

Leads 121 and 123 carry 220 volts A.C. Leads 131 and 133 are coupled to leads 121 and 123 and include the primary 135 of a step down transformer 137. Lead 131 includes a master on/off switch 139. Coupled to leads 131 and 133 are leads 141 and 143 which are coupled to the motor 75 which operates the fan 77. The door switch 145 is coupled to lead 141. The secondary 136 of the transformer 137 is coupled to the controller 81 by input 95. Solid state relays 151, 161, and 171 are coupled to leads 121 and 123 by way of leads 153, 154; 163, 164; and 173, 174, respectively. The electrical heating elements 41, 61, and 63 are coupled its leads 163, 173, and 153 respectively. Controller outputs 101, 105, and 107 are coupled to the relays 161, 151, and 171 respectively. Lead 109 is coupled to a buzzer 181. A thermocouple sensor 183 is coupled by lead 91 to the controller 81.

When switch 139 is closed, electrical power is applied to motor fan leads 141 and 143 and to the transformer 137 the latter of which applies a lower A.C. voltage to the controller 81. The controller 81 applies an output by way of lead 101 to the relay 161 which allows current flow through the element 41 sufficient to achieve the desired preset oven temperature i.e. 550° F. The thermocouple 183 is located in the oven and senses the temperature. If the temperature rises or falls above or below the preset temperature, a signal is applied by lead 91 to the controller 81 to cause a control voltage to be applied to the relay 161 by way of output 101 to lower or increase the current flow through the electrical heating element 41.

When buttons A, B, and C are pressed, the controller 81 sends a voltage to relays 151, 171 by way of outputs 105, 107 to allow the desired current to flow through the heating elements 63, 61 to obtain the desired cooking time periods and to obtain the desired percentages of power during the two stages of the cooking time periods. The outputs on leads 105 and 107 have time durations equal to the desired cooking time periods, as illustrated in FIG. 8. The voltage outputs on leads 105 and 107 also are represented by the diagrams of FIG. 8. After the cooking periods of elements 63 and 61 are completed, buttons D and E may be pressed, to control the relays 151 and 171 for an additional 10 seconds to allow current flow through the elements 63 and 61. The current flow through the relay 151, 161, and 171 and hence through the elements 63, 61, and 61 thus is controlled by the outputs on leads 105, 101, and 107 respectively from the controller 81.

As mentioned above, the controller 81 can be operated in a configuration or edit mode to allow the cooking process to be reprogrammed and stored or to allow another menu to be programmed and stored in the controller for cooking another type of food for example, calzone, bread, etc.

In the configuration mode, button A controls edit, button B controls enter, button C controls the scroll up sequence, button D controls home, button E controls escape, and button F controls the scroll down sequence. In order to program another menu, the following procedure is followed. Buttons C and F are pushed together for 3 seconds and released. A second menu page appears on the screen which allows the operator to set cook times and percent power for the left side (small pizza), (both broilers are on simultaneously) large pizza and the right side (small pizza). Next the two left bottom buttons D and E are held down for approximately six seconds. This brings up the set up menu pages which can be sequentially viewed by pressing the down arrow button. In order to enter the set up menu page, the edit key is pressed while the desired page is displayed. The down arrow button F is pushed in order to scroll through each category. If the operator wants to change a parameter, Edit is selected; the arrows C or F are pressed to scroll up or down and then Enter is selected. The operator can then move on to the next category. If no changes are desired for any other categories, Enter is hit twice to get out of Setup.

Referring to Table I, the left column identifies the parameters to be changed for each category, the middle column indicates the parameters to be selected as they are scrolled through and the right column defines in more detail the parameters. Lines 2–6 refer to broilers 61 and 63 operating simultaneously and lines 7–11 refer to the selected broiler 61 or 63 operating separately. Referring to lines 2–6, line 2 allows the operator to select the percent of power initially, line 3 allows the operator to select the percent of power at the second step or phase;

line 4 allows the operator to select the total time on for the broiler, line 5 allows the operator to select the initial time before the controller 81 switches to the second phase; and line 6 indicates the firing sequence. It allows the operator to cause the controller 81 to fire the selected broiler at the beginning, middle, or end of the cook time. The parameters to be selected or changed in lines 7–11 correspond with those of lines 2–6, however, they apply only to element 61 or element 63 depending on which one is being programmed. This can be accomplished by scrolling to the next function i.e. from small broiler right to small broiler left.

TABLE 1

| | | | |
|---|---|---|---|
| 1. | SEtPT | 550° F. | (Setpoint) |
| 2. | LbP1 | 100 | (Large broiler, % power Initial) |
| 3. | LbP2 | 100 | (Large broiler, % power Second Step) |
| 4. | Lb tt | 1:30 | (Larger broiler, Total Time On) |
| 5. | Lb St | :30 | (Large broiler, Switch Time: Activates 2nd Step. How long before controller switches to 2nd phase.) |
| 6. | LFilrE | ENd, bEg, dEL | (Large broiler, Firing Sequence) |
| 7. | SbP1 | 100 | (Small broiler, % power Initial) |
| 8. | SbP2 | 100 | (Small broiler, % power Second Step) |
| 9. | Sb tt | 2:10 | (Small broiler, Total Time On) |
| 10. | Sb St | :01 | (Small broiler, Switch Time) |
| 11. | SFirE | End, bEg, dEL | (Small broiler, Firing Sequence) |

The invention is used for heating or cooking food but is not limited to processing food.

What is claimed is:

1. An oven for cooking food, comprising:

a housing, a support means located in said housing for supporting food to be cooked, a lower electrical resistance heating element located in said housing below said support means, two separate laterally spaced apart upper electrical resistance heating elements located in said housing and supported above said support means and the food to be cooked, the space between each of said two upper heating elements and said support means being defined as a cooking zone, means for supplying A.C. electrical power to said lower electrical resistance heating element and to said two upper electrical heating elements, control means for controlling A.C. electrical power applied to said lower electrical resistance heating element and to said two upper electrical resistance heating elements to apply A.C. electrical power to each of said upper electrical resistance heating elements (a) simultaneously and (b) separately.

2. The oven of claim 1 said control means comprises means for varying the time period that A.C. electrical power is applied to each of said two upper electrical resistance heating elements and for varying the amount of A.C. electrical power applied to each said upper electrical resistance heating element during said time period of each of said two upper electrical resistance heating elements.

3. The oven of claim 1, wherein:

said support means comprises a ceramic member.

4. The oven of claim 2, wherein:

said support means comprises a ceramic member.

5. The oven of claim 1, wherein:

said lower electrical resistance heating element comprises two ends with a continuous electrically conductive, member extending in a given plane between said two ends and shaped to have at least one U-shaped turn between its said two ends and wherein heat is generated upon the flow of current between its said two ends, each of said upper electrical resistance heating elements comprises two ends with a continuous electrically conductive member extending in a given plane between its said two ends and shaped to have at least one U-shaped turn between its said two ends, said two upper electrical resistance heating elements being located generally in the same plane.

6. The oven of claim 5, wherein:

the length of said lower electrical resistance heating element between its two said ends is much longer than the length of either of said upper electrical resistance heating elements between its said two ends.

7. The oven of claim 6, wherein:

said support means comprises a rectangular member having dimensions of a given length and a given width, said lower electrical heating element is configured to be located within the dimensions of said given length and width when located below said support means, said upper electrical resistance heating elements are configured to be located within the dimensions of said given length and said given width when laterally spaced apart and supported above said support means.

8. The oven of claim 1, comprising:

a heat sensor located in said housing and coupled to said control means and located in said oven for sensing the temperature in said oven, said control means being programmed to control the voltage applied to said lower electrical heating element to maintain the temperature in said oven at a given temperature.

9. The oven of claim 7, comprising:

a heat sensor located in said housing and coupled to said control means and located in said oven for sensing the temperature in said oven, said control means being programmed to control the voltage applied to said lower electrical heating element to maintain the temperature in said oven at a given temperature.

10. The oven of claim 1, comprising:

two electrical power leads with one of said electrical power leads being coupled to said two upper heating elements and with the other of said electrical power leads being coupled to said two upper heating elements by way of said control means, and means for applying at least 200 volts A.C. to said two electrical power leads.

11. The oven of claim 5 comprising:

two electrical power leads with one of said electrical power leads being coupled to said two upper heating elements and with the other of said electrical power leads being coupled to said two upper heating elements by way of said control means, and means for applying at least 200 volts A.C. to said two electrical power leads.

12. The oven of claim 1, wherein:
said control means is adapted to control the application of AC electrical power to said two upper heating elements to:
   (a) apply electrical power to only one of said two upper heating elements to cook a food item in the cooking zone below said one upper heating element with the zone below the other of said heating elements being free of a food item,
   (b) apply electrical power to said two upper heating elements to cook one food item in the cooking zone below one of said upper heating elements beginning at a first time period and a different food item in the cooking zone below the other of said upper heating element beginning at a time period after the start of said first time period,
   (c) apply electrical power to said two upper heating elements to cook two separate food items below said two upper heating elements respectively for different time periods,
   (d) apply electrical power to said two upper heating elements to cook two separate food items below said two upper heating elements respectively at different electrical power levels,
   (e) apply electrical power to said two upper heating elements to cook to separate food items below said two upper heating elements respectively for different time periods and at different electrical power levels,
   (f) apply electrical power to said two upper heating elements to cook a single food item large enough to be located below both of said two upper heating elements.

13. The oven of claim 5, wherein:
said control means is adapted to control the application of AC electrical power to said two upper heating elements to:
   (a) apply electrical power to only one of said two upper heating elements to cook a food item in the cooking zone below said one upper heating element with the zone below the other of said heating elements being free of a food item,
   (b) apply electrical power to said two upper heating elements to cook one food item in the cooking zone below one of said upper heating elements beginning at a first time period and a different food item in the cooking zone below the other of said upper heating element beginning at a time period after the start of said first time period,
   (c) apply electrical power to said two upper heating elements to cook two separate food items below said two upper heating elements respectively for different time periods,
   (d) apply electrical power to said two upper heating elements to cook two separate food items below said two upper heating elements respectively at different electrical power levels,
   (e) apply electrical power to said two upper heating elements to cook two separate food items below said two upper heating elements respectively for different time periods and at different electrical power levels,
   (f) apply electrical power to said two upper heating elements to cook a single food item large enough to be located below both of said two upper heating elements.

14. A oven for cooking food, comprising:
a housing,
a support means located in said housing for supporting food to be cooked,
a lower electrical heating element located in said housing below said support means,
two separate laterally spaced apart upper electrical heating elements located in said housing and supported above said support means and the food to be cooked,
each of said electrical heating elements being of the type having two ends with a continuous electrically conductive member extending between its said two ends for the flow of electrical current through each of said electrical heating elements,
means for supplying A.C. electrical power to said lower electrical heating element and to said two upper electrical heating elements,
control means for controlling A.C. electrical power applied to said lower heating element and to said two upper electrical heating elements to apply A.C. electrical power to each of said upper electrical heating elements (a) simultaneously and (b) separately.

15. The oven of claim 14 wherein said control means comprises means for varying the time period that A.C. electrical power is applied to each of said two upper electrical heating elements and for varying the amount of A.C. electrical power applied to each of said upper electrical heating elements during said time period of each of said two upper electrical heating elements.

16. The oven of claim 15, wherein:
said control means is adapted to control the application of AC electrical power to said two upper heating elements to:
   (a) apply electrical power to only one of said two upper heating elements to cook a food item in the cooking zone below said one upper heating element with the zone below the other of said heating elements being free of a food item,
   (b) apply electrical power to said two upper heating elements to cook one food item in the cooking zone below one of said upper heating elements beginning at a first time period and a different food item in the cooking zone below the other of said upper heating element beginning at a time period after the start of said first time period,
   (c) apply electrical power to said two upper heating elements to cook two separate food items below said two upper heating elements respectively for different time periods,
   (d) apply electrical power to said two upper heating elements to cook two separate food items below said two upper heating elements respectively for different time periods and at different electrical power levels,
   (f) apply electrical power to said two upper heating elements to cook a single food item large enough to be located below both of said two upper heating elements.

17. The oven of claim 15, comprising:
two electrical power leads with one of said electrical power leads being coupled to said two upper heating elements and with the other of said electrical power leads being coupled to said two upper heating elements by way of said control means, and means for applying at least 200 volts A.C. to said two electrical power leads.

18. The oven of claim 16, comprising:

two electrical power leads with one of said electrical power leads being coupled to said two upper heating elements and with the other of said electrical power leads being coupled to said two upper heating elements by way of said control means, and means for applying at least 200 volts A.C. to said two electrical power leads.

* * * * *

UNITED STATES PATENT AND TRADEMARK OFFICE
CERTIFICATE OF CORRECTION

PATENT NO. : 6,114,663
DATED : September 5, 2000
INVENTOR(S) : Edward E. Stockley It is certified that error appears in the above-identified patent and that said Letters Patent is hereby corrected as shown below:

Drawings,
Sheet 4, that portion of Fig.5, showing the connection of lead 123 to lead 174 and lead 121 to lead 173 by way of the upper right broiler 61 should be shown as follows:

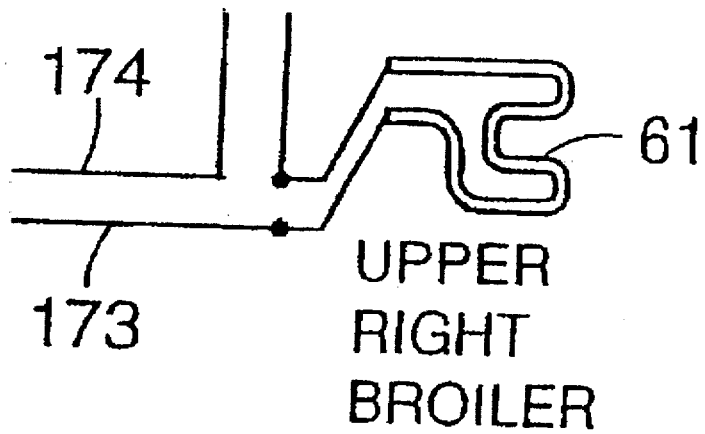

Signed and Sealed this

Fifth Day of March, 2002

Attest:

Attesting Officer

JAMES E. ROGAN
Director of the United States Patent and Trademark Office